United States Patent
Ploemen et al.

(10) Patent No.: US 9,464,235 B2
(45) Date of Patent: Oct. 11, 2016

(54) METHOD FOR EXTRACTING BITUMEN FROM AN OIL SAND STREAM

(71) Applicants: Shell Canada Energy, Calgary (CA); Chevron Canada Limited, Calgary (CA); Marathon Oil Sands L.P., Calgary (CA)

(72) Inventors: Ingmar Hubertus Josephina Ploemen, Amsterdam (NL); Gerhardus Willem Colenbrander, Amsterdam (NL); Anjana Kalpesh Bhalodi, Bangalore (IN)

(73) Assignee: Shell Oil Company, Houston, TX (US)

( * ) Notice: Subject to any disclaimer, the term of this patent is extended or adjusted under 35 U.S.C. 154(b) by 586 days.

(21) Appl. No.: 14/034,245

(22) Filed: Sep. 23, 2013

(65) Prior Publication Data

US 2014/0083332 A1    Mar. 27, 2014

Related U.S. Application Data

(60) Provisional application No. 61/704,923, filed on Sep. 24, 2012.

(51) Int. Cl.
*C10G 1/04* (2006.01)
*C10G 53/06* (2006.01)
*C08L 95/00* (2006.01)

(52) U.S. Cl.
CPC ............. *C10G 1/045* (2013.01); *C10G 1/04* (2013.01); *C10G 1/042* (2013.01); *C10G 53/06* (2013.01); *C08L 95/00* (2013.01)

(58) Field of Classification Search
CPC ........ C10G 1/04; C10G 1/042; C10G 1/045; C10G 53/06
See application file for complete search history.

(56) References Cited

U.S. PATENT DOCUMENTS

| | | | |
|---|---|---|---|
| 3,475,318 A | 10/1969 | Gable et al. | |
| 4,139,450 A * | 2/1979 | Hanson | C10G 1/04 208/390 |
| 8,257,580 B2 * | 9/2012 | Duyvesteyn | C10G 1/04 208/390 |
| 2008/0210602 A1 * | 9/2008 | Duyvesteyn | C10G 1/045 208/390 |
| 2009/0301937 A1 | 12/2009 | Duyvesteyn et al. | |
| 2011/0127197 A1 * | 6/2011 | Blackbourn | C10G 1/04 208/390 |

FOREIGN PATENT DOCUMENTS

WO    WO2011021092 A2    2/2011

* cited by examiner

*Primary Examiner* — Renee E Robinson

(57) ABSTRACT

The present invention provides a method for extracting bitumen from an oil sand stream, the method comprising at least the steps of, a) providing an oil sand stream; b) contacting the oil sand stream with a liquid comprising a solvent to obtain a solvent-diluted oil sand slurry; c) separating the oil sand slurry to obtain a first solids-depleted stream and a first solids-enriched stream; d) filtering the first solids-enriched stream obtained in step c) to obtain bitumen-depleted sand and at least a first filtrate; e) separating at least a part of the first filtrate to obtain a second solids-depleted stream and a second solids-enriched stream; and f) contacting at least a part of the second solids-enriched stream from step e) with solvent to obtain a solvent-diluted second solids-enriched stream; and g) separating the solvent-diluted second solids-enriched stream to obtain a third solids-enriched stream and a third solids-depleted stream.

5 Claims, 1 Drawing Sheet

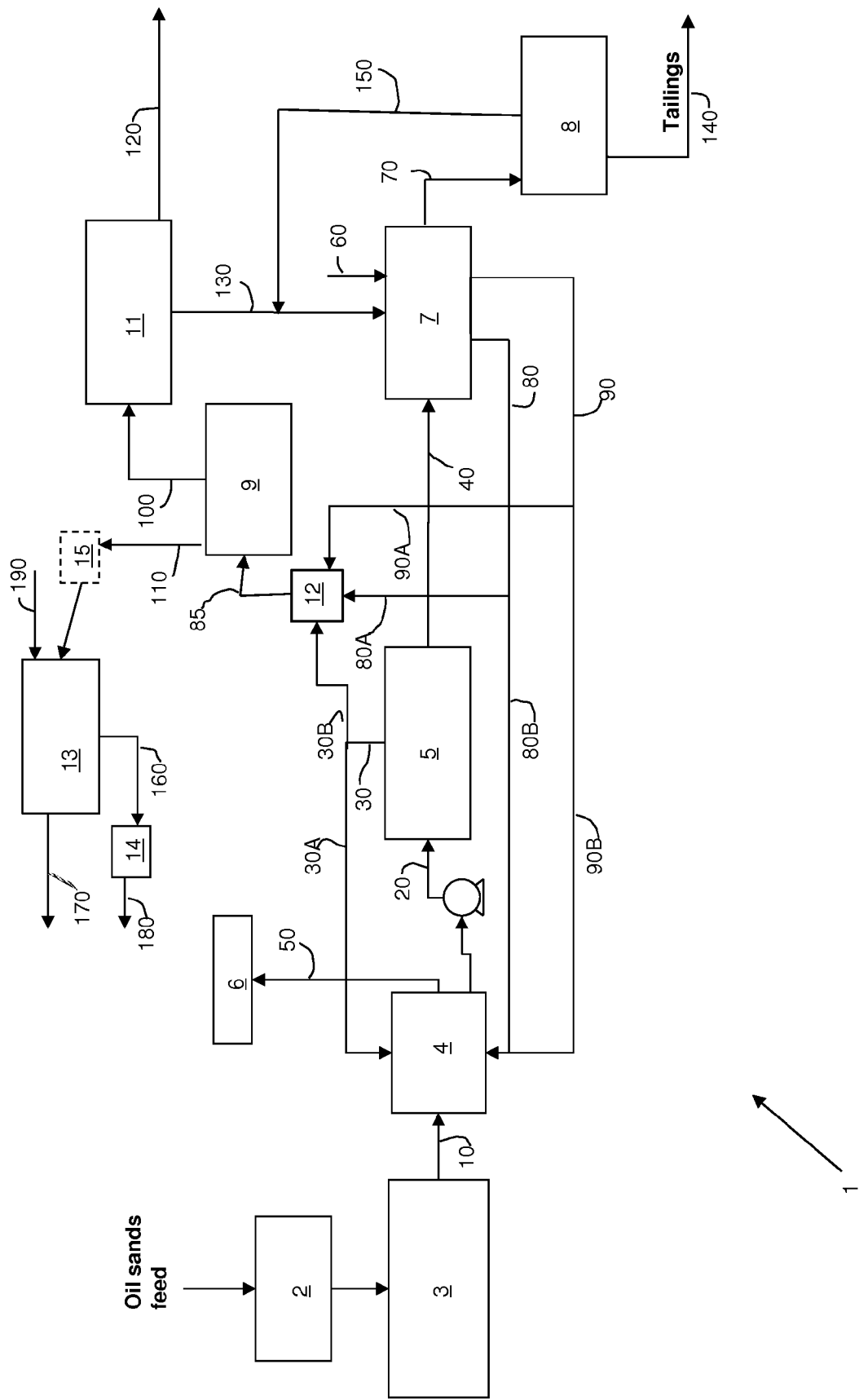

METHOD FOR EXTRACTING BITUMEN FROM AN OIL SAND STREAM

RELATED APPLICATIONS

This application claims the benefit of U.S. provisional application 61/704,923 filed Sep. 24, 2012, which is incorporated herein by reference.

BACKGROUND

The present invention relates to a method for extracting bitumen from an oil sand.

Various methods have been proposed in the past for the recovery of bitumen (sometimes referred to as "tar" or "bituminous material") from oil sands as found in various locations throughout the world and in particular in Canada such as in the Athabasca district in Alberta and in the United States such as in the Utah oil sands. Typically, oil sand (also known as "bituminous sand" or "tar sand") comprises a mixture of bitumen (in this context also known as "crude bitumen", a semi-solid form of crude oil; also known as "extremely heavy crude oil"), sand, clay minerals and water. Usually, oil sand contains about 5 to 25 wt. % bitumen (as meant according to the present invention), about 1 to 13 wt. % water, the remainder being sand and clay minerals.

As an example, it has been proposed and practiced at commercial scale to recover the bitumen content from the oil sand by mixing the oil sand with water and separating the bitumen froth from the aqueous slurry formed. Disadvantages of such aqueous extraction processes are the need for extremely large quantities of process water (typically drawn from natural sources) and issues with removing the bitumen from the aqueous phase (whilst emulsions are being formed) and removing water from the bitumen-depleted sand (and clay).

Other methods have proposed non-aqueous extraction processes to reduce the need for large quantities of process water. Example of such a non-aqueous extraction process are disclosed in e.g. U.S. Pat. No. 3,475,318, US 2009/0301937 and WO 2011/021092, the teaching of which is hereby incorporated by reference.

There is a continuous desire to improve the process efficiency in methods for extracting bitumen from an oil sand stream. It is an object of the present invention to meet this desire and to provide a more efficient method for extracting bitumen from an oil sand stream.

It is a further object of the present invention to provide an alternative non-aqueous solvent based extraction process for extracting bitumen from an oil sand.

One or more of the above or other objects may be achieved according to the present invention by providing a method for extracting bitumen from an oil sand stream, the method comprising at least the steps of:
(a) providing an oil sand stream;
(b) contacting the oil sand stream with a liquid comprising a solvent thereby obtaining a solvent-diluted oil sand slurry;
(c) separating the solvent-diluted oil sand slurry, thereby obtaining a first solids-depleted stream and a first solids-enriched stream;
(d) filtering the first solids-enriched stream obtained in step (c), thereby obtaining bitumen-depleted sand and at least a first filtrate;
(e) separating at least a part of the first filtrate thereby obtaining a second solids-depleted stream and a second solids-enriched stream; and
(f) contacting at least a part of the second solids-enriched stream as obtained in step (e) with solvent thereby obtaining a solvent-diluted second solids-enriched stream; and
(g) separating the solvent-diluted second solids-enriched stream thereby obtaining a third solids-enriched stream and a third solids-depleted stream.

It has now surprisingly been found according to the present invention that bitumen can be extracted from an oil sand stream in a surprisingly efficient and simple manner.

A further advantage of the present invention is that no tailings ponds are required because no water needs to be used in the bitumen extraction process.

Also, by further processing the second solids-enriched stream as obtained in step (e), more bitumen is recovered thereby increasing the overall bitumen recovery of the extraction process.

According to the present invention, the providing of the oil sand in step (a) can be done in various ways. Typically, before contacting the dry oil sand (which may contain some water being present in the oil sand) with the solvent the oil sand lumps are reduced in size, e.g. by crushing, breaking and/or grinding, to below a desired size upper limit. Experience in large scale operations shows that the achievable size upper limit for such size reduction is currently about 8 inch.

The contacting in step (b) of the oil sand with the liquid comprising a solvent thereby obtaining a solvent-diluted oil sand slurry is not limited in any way either. As an example, the liquid may be added before, during or after the size-reducing step (if available) of the oil sand. Further size reduction in the presence of the liquid (comprising the solvent) may be performed; part of the size reduction may take place by dissolution of bitumen present in the oil sand (bitumen acts as a bonding agent for the oil sand lumps), but further size reduction e.g. by using screens and/or again crushers, breaker or grinders may be performed, if desired. Typically, the solvent forms the major part of the liquid and is preferably present in an amount of from 40 wt. % up to 100 wt. %, preferably above 60 wt. %, more preferably above 70 wt. %, even more preferably above 80 or even above 90 wt. %, based on the amount of the liquid. The liquid may contain some solids, for example if the liquid is recycled from a downstream part of the process.

The solvent as used in the method of the present invention may be selected from a wide variety of solvents, including aromatic hydrocarbon solvents and saturated or unsaturated aliphatic (i.e. non-aromatic) hydrocarbon solvents; aliphatic hydrocarbon solvents may include linear, branched or cyclic alkanes and alkenes and mixtures thereof. Preferably, the solvent in step (b) is a non-aqueous solvent and preferably comprises an aliphatic hydrocarbon having from 3 to 9 carbon atoms per molecule, more preferably from 4 to 7 carbons per molecule, or a combination thereof. Especially suitable solvents are saturated aliphatic hydrocarbons such as propane, butane, pentane, hexane, heptane, octane and nonane (including isomers thereof), in particular butane, pentane, hexane and heptane. It is preferred that the solvent in step (b) comprises at least 90 wt. % of the aliphatic hydrocarbon having from 3 to 9 carbon atoms per molecule, preferably at least 95 wt. %. Also, it is preferred that in step (b) substantially no aromatic solvent (such as toluene or benzene) is present, i.e. less than 5 wt. %, preferably less than 1 wt. %. Further it is preferred that a single solvent is used as this avoids the need for a distillation unit or the like to separate solvents. Also it is preferred that no water is added during the contacting in step (b). However, the oil sand may intrinsically contain some water; preferably the solvent-diluted slurry comprises less than 15 wt. % water, preferably less than 10 wt. %.

Preferably, the lumps in the solvent-diluted oil sand slurry obtained in step (b) are screened or reduced in size to have a diameter below 5.0 cm, preferably below 2.0 cm, more preferably below 1.0 cm. As the screening or size reduction is performed in the presence of solvent (rather than size reduction under dry conditions), this helps breaking down the larger lumps and dissolving the bitumen. Additionally, by mixing the oil sand stream with the solvent before performing the filtration (in step (d)), the viscosity of the bitumen present in the oil sand is reduced, which leads to a (desired) increased filtration rate.

Preferably, the solvent-diluted oil sand slurry obtained in step (b) has such a S/B weight ratio that at least 75 wt. %, preferably at least 90 wt. %, more preferably at least 95 wt.% (and most preferably substantially all) of the asphaltenes in the bitumen remain dissolved to avoid asphalthene precipitation. The person skilled in the art will readily understand that the appropriate S/B weight ratio to achieve this is dependent on the solvent(s) used. Preferably, the solvent-diluted oil sand slurry obtained in step (b) has a solvent-to-bitumen (S/B) weight ratio of from 0.5 to 1.5, preferably above 0.7 and preferably below 1.3, more preferably below 1.1.

Further it is preferred that the solvent-diluted oil sand slurry obtained in step (b) comprises from 10 to 60 vol. % of solids, preferably from 20 to 40 vol. %, more preferably from 25 to 35 vol. %.

After contacting the oil sand with the solvent in step (b) to obtain a solvent-diluted oil sand slurry, the solvent-diluted oil sand slurry is separated in step (c), thereby obtaining a first solids-depleted stream and a first solids-enriched stream.

Usually, the slurry stream as separated in step (c) has about the same S/B weight ratio as when obtained during the contacting of step (b), but may deviate somewhat if further solvent streams are added just before separating in step (c).

Preferably, the first solids-enriched stream obtained in step (c) comprises from 30 to 70 vol.% of solids, preferably above 40 vol. %, more preferably above 50 vol. %. Typically, the first solids-enriched stream obtained in step (c) has about the same S/B weight ratio as the solvent-diluted oil sand slurry obtained in step (b), hence preferably from 0.5 to 1.5.

The first solids-depleted stream obtained in the separation of step (c) may have several uses. Preferably, at least a part of the first solids-depleted stream is reused in the contacting of step (b), to maintain a desired solvent content during the contacting of step (b). In some embodiments, all of the first solids-depleted stream is reused in the contacting of step (b). In other embodiments, at least a part of the first solids-depleted stream is reused in the separation of step (e); preferably at least a part of the first solids-depleted stream is combined with the part of the first filtrate to be separated in step (e), thereby obtaining a combined stream, which combined stream is subsequently separated in step (e).

In step (d), the first solids-enriched stream is filtered thereby obtaining bitumen-depleted sand and at least a first (usually bitumen-containing) filtrate. Usually, the bitumen-depleted sand is dried, thereby obtaining a dried bitumen-depleted sand stream containing less than 500 ppmw, preferably less than 300 ppmw, of the solvent.

The person skilled in the art will readily understand that in step (d) one or more filtrates may be obtained which may be reused in other parts of the process. In case only one filtrate stream is obtained, this single filtrate stream is the "first" filtrate stream. However, typically two or more filtrate streams are obtained.

Preferably, the first filtrate has an S/B weight ratio of from 0.5 to 1.5, preferably above 0.7 and preferably below 1.3, more preferably below 1.1. Further it is preferred that the first filtrate comprises from 0.1 to 5.0 wt. % of solids, preferably above 0.5 wt. %, and preferably below 2.0 wt. %.

The person skilled in the art will readily understand that the filtering in step (d) can be performed in many different ways. Although some fresh solvent may be used at the start-up of the process of the present invention, the addition of fresh solvent later on is preferably kept to a minimum; most of the solvent used in the filtration step is recycled from downstream of the process. Also, the splitting of the one or more filtrates in the first and/or second (and optionally further) filtrates can be performed in various ways. Typically, the first filtrate obtained in step (d) leaves the filter cake earlier than the second filtrate obtained in step (d).

Preferably the part of the first filtrate to be separated in step (e) is heated, preferably to a temperature in the range from 70 to 130° C. In case the first filtrate has been combined with another stream or streams to a combined stream, it is preferably the combined stream that is heated, again preferably to a temperature in the range from 70 to 130° C. Alternatively the individual streams forming the combined streams may have been pre-heated individually, rather than heating the combined stream.

In a preferred embodiment a part of the first filtrate is reused in the contacting of step (b). Further it is preferred that in step (d) a second filtrate is obtained, which is preferably at least partly reused in the contacting of step (b). Preferably, the second filtrate is relatively bitumen-depleted and preferably has an S/B weight ratio of above 3.0, more preferably above 5.0 and typically below 200.

In step (e) at least a part of the first filtrate is separated thereby obtaining a second solids-depleted stream and a second solids-enriched stream. Typically, solvent is recovered from this second solids-depleted stream and subsequently the bitumen may be sent to a refinery or the like for further upgrading. The separation in step (e) typically takes place in a clarifier, or in any other suitable solid/liquid separator (including gravity separators and cyclones); as the person skilled in the art is familiar with this kind of separators, this is not further discussed in detail. If desired, agglomeration agents such as alkali, Portland cement, lime, ash, polymers, gypsum, etc. may be used in the separation of step (e) to promote the formation of aggregates.

The composition of the second solids-enriched stream may vary broadly. Typically, the second solids-enriched stream obtained in step (e) comprises from 5.0 to 50.0 vol. % of solids, preferably above 30 vol. %, more preferably above 40 vol. %. Typically, the second solids-enriched stream obtained in step (e) has an S/B weight ratio of at least 1.2 and typically below 2.5.

Preferably, before separating in step (e), the S/B weight ratio of at least the part of the first filtrate to be separated is increased by combining it with a stream having a higher S/B weight ratio thereby obtaining a combined stream. Typically, the combining takes place in a mixing unit. In case an aliphatic solvent is used in both steps (b) and (e), which is preferred, the increase in the S/B weight ratio may cause the precipitation of at least some of the asphaltenes present in the combined stream. The stream having a higher S/B weight ratio may be any stream or combinations of streams and may include pure solvent.

According to an especially preferred embodiment, at least a part of the second filtrate is reused in step (e). Preferably, the part of the second filtrate to be reused in step (e) is combined with the part of the first filtrate to be separated in step (e) thereby obtaining a combined stream. Further it is preferred that the combined stream to be separated in step (e) has an S/B weight ratio of at least 1.2, and typically below 2.5.

It is preferred that at least a part of the second solids-enriched stream obtained in step (e) is reused in the filtering of step (d).

Preferably, at least a part of the second solids-enriched stream as obtained in step (e) is reused in the contacting of step (b) or the separating of step (c). This reuse in step (b) can be done in various ways, for example by combining the second solids-enriched stream with the oil sand stream provided in step (a) or by feeding the second solids-enriched stream directly in the device in which the contacting of step (b) is performed. If desired, before reusing in step (b), the S/B weight ratio of the second solids-enriched stream may be decreased, for example by solvent evaporation or combining with the part of the first filtrate that is reused in the contacting of step (b).

Instead of (or in addition to) reusing at least a part of the second solids-enriched stream as obtained in step (e) in the contacting of step (b), it can be reused in step (c), e.g. by combining it with the solvent-diluted oil sand slurry before separating in step (c) or by directly feeding it as a separate stream into the device in which the separation of step (c) takes place.

In step (f), at least a part of the second solids-enriched stream as obtained in step (e) is contacted with solvent thereby obtaining a solvent-diluted second solids-enriched stream. Herewith, the maltenes content of the third solids-enriched stream to be obtained in step (g) will be minimised. As for the contacting in step (b), the contacting in step (f) is not limited in any way either. The contacting of step (f) with solvent, can take place before and/or during the separating of step (g). The solvent is preferably the same solvent (albeit possibly at a different concentration) as the solvent used in step (b). The solvent as used in step (f) can be obtained from several sources, such as from a filtrate stream as generated in the filtering of step (d); also, fresh solvent can be used.

In step (g) the solvent-diluted second solids-enriched stream is separated thereby obtaining a third solids-enriched stream and a third solids-depleted stream. Typically, the third solids-enriched stream has a relatively low maltene content, such as below 10 wt. % of the solids content. Typically, the third solids-enriched stream obtained in step (g) comprises from 5.0 to 50.0 vol. % solids, preferably above 30.0 wt. %, more preferably above 40 wt. %.

The separating in step (g) can be performed in various ways and is not limited in any way and can be used in a wide range of devices, including a clarifier, a filter and a centrifuge or the like. If desired, two or more clarifiers (or filters or the like) may be operated with fresh solvent, with the second solids-enriched stream flowing in a counter-current fashion with respect to the direction of flow of the solvent, in order to further reduce the maltene content of the third solids-enriched stream.

Preferably, the separating of step (g) takes places in a clarifier. The contacting of step (f) and the separating of step (g) may take place in one and the same device (such as a filter or clarifier) or different devices.

According to an especially preferred embodiment of the present invention, the third solids-enriched stream is dried, thereby obtaining a dried third solids-enriched stream.

In a further aspect, the present invention provides a composition, at least comprising:
  bitumen, wherein the bitumen contains at least 75 wt. % asphaltenes; and
  from 1.0 to 50.0 wt. % mineral solids.

Preferably, the bitumen contains at least 80 wt. %, preferably at least 85 wt. %, more preferably at least 90 wt. %, even more preferably at least 95 wt. % asphaltenes.

Further it is preferred that the composition comprises from 30 to 95 wt. % bitumen, preferably above 40 wt. %, more preferably above 50 wt. %, and preferably below 90 wt. %, more preferably below 85 wt. %. Also, it is preferred that the composition comprises at most 40.0 wt. % mineral solids, preferably at most 30.0 wt. %; preferably the composition comprises at least 5.0 wt. % mineral solids, preferably at least 10.0 wt. %. Further, it is preferred that at least 80 wt. %, preferably at least 90 wt. %, more preferably at least 95 wt. % of the mineral solids has a maximum particle size of at most 2.0 mm, preferably at most 0.5 mm. Moreover it is preferred that the composition comprises less than 5.0 wt. %, preferably less than 1.0 wt. %, more preferably less than 500 ppmw, even more preferably less than 300 ppmw, of an aliphatic hydrocarbon solvent.

In a further aspect the present invention provides the use of the composition according to the present invention in sulphur concrete, sulphur and bitumen based concrete, asphalt or as a fuel (e.g. in a boiler or furnace, or as a feed to a gasifier).

BRIEF DESCRIPTION OF THE DRAWING

Hereinafter the invention will be further illustrated by the following non-limiting drawing, which is a schematic representation of a process scheme of a method in accordance with the present invention.

DETAILED DESCRIPTION

For the purpose of this description, a single reference number will be assigned to a line as well as a stream carried in that line. Same reference numbers refer to the same or similar elements.

FIG. 1 schematically shows a simplified process scheme of a first embodiment according to the present invention for extracting bitumen (i.e. in the context of the invention a bituminous and/or extremely heavy crude oil like material) from an oil sand stream. The process scheme is generally referred to with reference number 1. The process scheme 1 shows a crusher 2, a de-oxygenation unit 3, a mixer 4, a solid/liquid separator (such as a settler or hydrocylone) 5, a rejects dryer 6, a filter 7, a dryer 8, a clarifier 9, a SRC (solvent recovery column) 11, a further mixer 12, a second clarifier 13 and a dryer 14. An optional further mixer 15 has been indicated as well (to which e.g. all or part of stream 190 may be fed).

During use of the process scheme of FIG. 1, an oil sand stream 10 is provided and fed to the mixer 4. Typically, before entering the mixer 4, the oil sand stream 10 has been crushed (e.g. in crusher 2) or treated otherwise, to reduce the size of the larger oil sand lumps to below a pre-determined upper limit Experience in large scale operations shows that the achievable size upper limit for such size reduction is currently about 8 inch. Further, the oil sand stream is usually de-oxygenated (e.g. in de-oxygenation unit 3), in particular when a non-aqueous solvent is subsequently used for the bitumen extraction.

In the embodiment of FIG. 1, the oil sand stream 10 is contacted in the mixer 4 with a non-aqueous solvent stream preferably containing an aliphatic hydrocarbon solvent (and typically a certain amount of bitumen), thereby obtaining a solvent-diluted oil sand slurry 20. The person skilled in the art will readily understand that to this end a wide variety of streams, both in terms of composition and origin, can be used. In the embodiment shown in FIG. 1 streams 30A, 80B and 90B (which are further discussed below; recycled from downstream of the process) are used, although the person skilled in the art will readily understand that one or more of the streams 30A, 80B, 90B may not be used. Also, other streams (such as stream 170) may be used instead or in addition.

Usually, in the mixer 4 (or in a separate unit, if needed, such as a screen), the (bitumen-containing) lumps of the solvent-diluted oil sand slurry obtained are reduced in size, typically to have a diameter below 5.0 cm, preferably below 2.0 cm, more preferably below 1.0 cm. Any undesired materials (such as rocks and woody material) that may hinder downstream processing may be removed by using screens or the like and the remaining oil sand particles are reduced in size in the presence of the solvent, e.g. by crushing, breaking and/or grinding. Typically the contacting step in mixer 4 is performed at about ambient temperatures, preferably at a temperature in the range from 0-40° C., and at about atmospheric pressure.

In the embodiment of FIG. 1 an optional stream 50 exiting the mixer 4 is shown that may be sent to the rejects dryer 6. This stream 50 may contain rejects (any undesired materials such as rocks and woody material).

The slurry stream 20 exiting the mixer 4 is fed (using a pump) into the settler 5 and the solids in the slurry stream 20 are allowed to settle, thereby obtaining (as an overflow) a first solids-depleted stream 30 and (as an underflow) a first solids-enriched stream 40. Although additional solvent may be fed to the settler 5, it is preferred that no additional solvent is fed into the settler 5 other than with the slurry stream 20.

In the embodiment of FIG. 1 at least a part 30A of the first solids-depleted stream 30 is recycled to and reused in the mixer 4. As shown, a part 30B of the first solids-depleted stream 30 may be sent to and further processed in clarifier 9 to remove fines; if desired, this stream 30B may be combined with stream 80A (and other streams) in mixer 12 to obtain combined stream 85.

The first solids-enriched stream 40 exiting the settler 5 is fed into the filter 7. Preferably, no intermediate washing with solvent takes place between the settler 5 and the filter 7. In the filter 7, the first solids-enriched stream 40 is filtered, thereby obtaining a bitumen-depleted sand stream 70, a first filtrate 80 and a second filtrate 90. Typically this bitumen-depleted sand stream 70 is the "filter cake" as used in the filter 7. This bitumen-depleted sand stream 70 may be sent to a dryer 8 and removed as dried stream 140; this dried stream 140 would in the art be referred to as "tailings". The dried stream 140 can be used for land reclamation. Of course, if needed, further removal of solvent from the dried stream 140 may be performed. As shown if FIG. 1, a recovered solvent stream 150 may be recycled from the dryer 8 to e.g. the filter 7.

In the embodiment of FIG. 1, a first (usually bitumen-containing) filtrate (removed as stream 80) and a second filtrate (removed as stream 90; usually containing less bitumen than stream 80 and consequently having a higher S/B weight ratio) are obtained in the filter 7. It goes without saying that further filtrate streams may be generated in the filter 7. In the embodiment of FIG. 1, the first filtrate 80 and the second filtrate 90 are both at least partly recycled to the mixer 4 (as streams 80B and 90B), but this recycling of the filtrate streams to the mixer 4 is (although preferred) not essential to the invention in the broadest sense.

As shown in the embodiment of FIG. 1, a stream 60 of fresh solvent may be fed to the filter 7, instead of or in addition of recycled solvent streams 130 (from the SRC 11) and 150 (from the dryer 8); of course other sources of solvent recycle streams may be used as well.

At least a part 80B of the first filtrate stream 80 obtained in the filter 7 may be reused in the contacting step in the mixer 4. As shown in the embodiment of FIG. 1, also the second filtrate 90 is partly reused (as stream 90B) in the mixer 4.

A part 80A of the first filtrate 80 and a part 90A of the second filtrate 90, and stream 30B are mixed in mixer 12 and sent to the clarifier 9 as combined stream 85. Instead of or in addition to stream 90A, a different stream or streams may be used to combine with first filtrate stream 80A to obtain the combined stream 85 (which has an increased S/B weight ratio when compared to first filtrate stream 80). The combined stream 85 may be heated, such as to a temperature of from 70 to 130° C. Alternatively, the streams (80A and 90A in FIG. 1) forming the combined stream 85 may be heated individually, before combining in the mixer 12.

In the clarifier 9 the combined stream 85 is separated, thereby obtaining a second solids-depleted overflow stream 100 and a solids-enriched underflow stream 110. As shown in FIG. 1, the second solids-depleted overflow stream 100 of the clarifier 9 may be sent to the SRC 11, whilst (in the embodiment of FIG. 1 all of) the solids-enriched underflow stream 110 of the clarifier 9 is sent to the second clarifier 13 (or a filter instead) and contacted with solvent stream 190. A part of the solids-enriched underflow stream 110 may be reused in the contacting in mixer 4 and combined with the first solids-enriched stream 40 and a part of the second solids-enriched underflow stream 110 may be combined with the solvent-diluted oil sand slurry 20. In the SRC 11, solvent is removed from the overflow 100 of the clarifier 9 thereby obtaining a bitumen-enriched stream 120; the solvent recovered in the SRC 11 may be recycled in the process, e.g. as a solvent stream 130 to the filter 7.

As mentioned above, at least a part (and preferably all) of the second solids-enriched stream 110 is sent to the second clarifier 13 and contacted with solvent 190 thereby obtaining a solvent-diluted second solids-enriched stream which is separated in the same clarifier (or filter) 13, thereby obtaining a third solids-enriched stream 160 and a third solids-depleted stream 170. The solvent stream 190 may be fresh solvent or a stream recycled form the process, such as part of stream 90. As shown as optional in FIG. 1, the second solids-enriched stream 110 may be sent to the (optional) mixer 15 first, to mix it with e.g. all or part of stream 190 before the resulting stream is fed to the second clarifier 13.

The third solids-enriched stream 160 obtained in the clarifier 13 is subsequently dried in dryer 14 thereby obtaining a dried third solids-enriched stream 180. The dried third solids-enriched stream 180 typically comprises from 30 to 95 wt. % bitumen (wherein the bitumen contains at least 75 wt. % asphaltenes) and at most 40.0 wt. % mineral solids. Preferably, at least 80 wt. % of the mineral solids in the stream 180 has a maximum particle size of at most 2.0 mm. Further, the stream 180 comprises less than 5.0 wt. % of an aliphatic hydrocarbon solvent.

The person skilled in the art will readily understand that many modifications may be made without departing from the scope of the invention. As mere examples, at least a part of the second solids-enriched stream 110 obtained during step (e) in the clarifier 9 may be reused in the filter 7. Also, a part of the second solids-enriched stream 110 may be combined with the solvent-diluted oil sand slurry 20 obtained in step (b) and subsequently fed into the solid/liquid separator 5.

What is claimed is:

1. A method for extracting bitumen from an oil sand stream, the method comprising at least the steps of:
   (a) providing an oil sand stream;
   (b) contacting the oil sand stream with a liquid comprising a solvent thereby obtaining a solvent-diluted oil sand slurry;
   (c) separating the solvent-diluted oil sand slurry, thereby obtaining a first solids-depleted stream and a first solids-enriched stream;
   (d) filtering the first solids-enriched stream obtained in step (c), thereby obtaining bitumen-depleted sand and at least a first filtrate;
   (e) separating at least a part of the first filtrate thereby obtaining a second solids-depleted stream and a second solids-enriched stream; and
   (f) contacting at least a part of the second solids-enriched stream as obtained in step
   (e) with solvent thereby obtaining a solvent-diluted second solids-enriched stream; and
   (g) separating the solvent-diluted second solids-enriched stream thereby obtaining a third solids-enriched stream and a third solids-depleted stream.

2. The method according to claim 1, wherein at least a part of the first solids-depleted stream is reused in the contacting of step (b).

3. The method according to claim 1, wherein at least a part of the first solids-depleted stream is combined with the part of the first filtrate to be separated in step (e), thereby obtaining a combined stream.

4. The method according to claim 1, wherein the separating of step (g) takes places in a clarifier.

5. The method according to claim 1, wherein the third solids-enriched stream is dried, thereby obtaining a dried third solids-enriched stream.

* * * * *